July 22, 1941. L. D. MILES Re. 21,861

LIQUID CATHODE DEVICE

Original Filed May 25, 1938

Inventor:
Lawrence D. Miles,
by Harry E. Dunham
His Attorney.

Reissued July 22, 1941 Re. 21,861

UNITED STATES PATENT OFFICE 21,861

LIQUID CATHODE DEVICE

Lawrence D. Miles, Schenectady, N. Y., assignor to General Electric Company, a corporation of New York Original No. 2,167,521, dated July 25, 1939, Serial No. 209,950, May 25, 1938. Application for reissue January 31, 1940, Serial No. 316,565

6 Claims. (Cl. 250—27.5)

The present invention relates to discharge devices of the type which employs a liquid or pool-type cathode.

Cathodes of this kind, such as mercury cathodes, are from their very nature subject to variations in surface level when subjected to sudden movements which tend to displace the cathode material. For applications where at least some motion is inevitable, as on shipboard, this presents obvious difficulties. These difficulties are especially marked where the cathode is to be used in connection with a discharge-controlling device which depends for its satisfactory operation on the maintenance of a fixed spatial relationship with the cathode surface.

It is an object of my present invention to provide means whereby at least a portion of the cathode surface may be maintained at a substantially fixed level in spite of substantial transverse or tilting motions of the device in which it is embodied.

Figure 1:
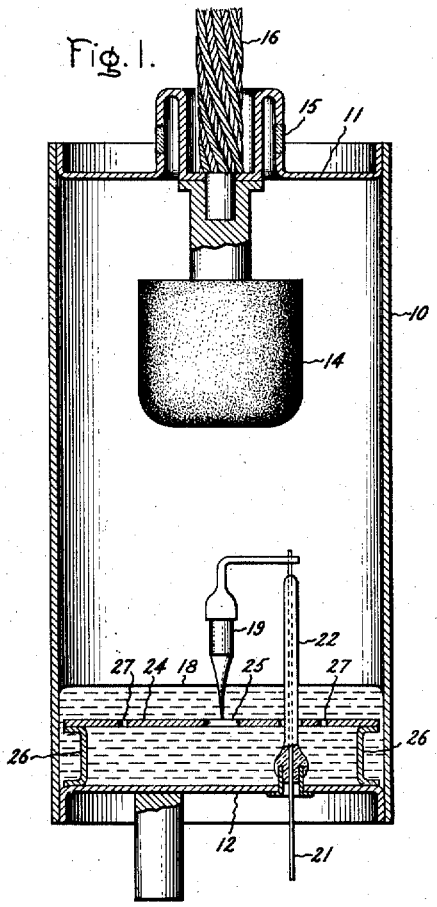
Figure 2:
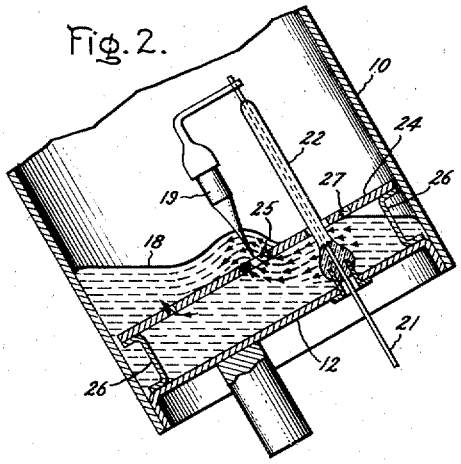
Figure 3:
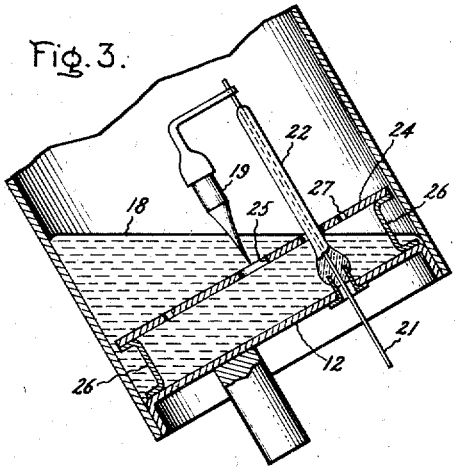
Figure 4:
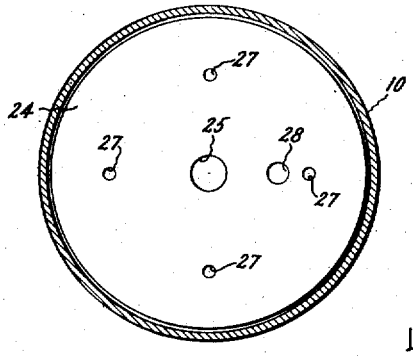

The features of novelty which I desire to protect herein are pointed out with particularity in the appended claims. The invention itself, together with further objects and advantages thereof, may best be understood by reference to the following description taken in connection with the drawing, in which Fig. 1 represents a longitudinal sectional view of a discharge device suitably embodying the invention; Fig. 2 is a fragmentary sectional view showing the condition of the cathode during transition of the device from one position to another; Fig. 3 illustrates a stable condition of the cathode when the device is in a tilted position, and Fig. 4 is a transverse sectional view showing the appearance of one of the elements of the invention as viewed from above.

Referring particularly to Fig. 1, I have shown a discharge device comprising an elongated metal envelope 10 which is of generally cylindrical outline. This is closed at its upper and lower ends by circular headers numbered 11 and 12, respectively, and is normally used with its central axis in a vertical position. Adjacent the upper end of the envelope there is provided an anode 14, suitably consisting of graphite. This is supported from the envelope by means of a hermetically sealed connection which includes an insulating ring 15, and is supplied with current by means of a heavy stranded conductor 16. At the lower end of the envelope there is provided a liquid cathode 18, for example of mercury, which is in direct contact with the metal of the envelope.

In order to make possible the operation of the device as a rectifier, some means must be provided for initating a discharge between the anode and the cathode at the beginning of each operating cycle. Such means may include, for example, an ignition electrode 19 which is in direct contact with the cathode surface and which is capable of initiating a cathode spot upon the passage of current therethrough. The electrode 19 may comprise, for example, a body of a semi-conducting material, such as silicon carbide or the like. It is supplied with current by means of a lead-in connection 21, which is insulated from the cathode by means of a coating 22 of glass or an equivalent insulating material.

It will be understood that the functioning of the electrode 19 is dependent on its being continuously in contact with the cathode surface. Furthermore, most satisfactory operation requires that the degree of immersion of the electrode be substantially constant at all times. My present invention provides means by which these conditions may be fulfilled in spite of the inherent mobility of the cathode material and the consequent likelihood of displacement thereof.

With this end in mind, I consider that the electrode 19 should be positioned at least approximately at the center of the mercury surface. In this way any transverse motion of the discharge device will produce the same effect irrespective of the direction in which it occurs. Furthermore, with this condition fulfilled, it is possible, within limits, to assure that the degree of immersion of the electrode 19 will be the same irrespective of the position of the envelope 10. This may be understood, for example, by referring to Fig. 3, wherein it appears that in spite of the fact that the axis of the device has been tilted substantially, the tip of the electrode 19 is still fully immersed in the cathode material. For this condition to obtain, it is necessary that the depth of cathode material be a substantial fraction of the diameter of the discharge device so that tilting the device thirty degrees or more does not cause the mercury level to pass below the line of intersection of the header 12 and the cylindrical wall of the envelope 10.

The factors which I have specified in the foregoing are sufficient to maintain contact between the ignition electrode and the cathode in various positions of stability or rest of the device. They do not, however, take into consideration effects occurring during periods of transition, that is, while the device is being tilted or moved transversely. During such periods, there is obviously a tendency for the mercury to surge from side to side in the envelope and to create waves which at times may cause the electrode 19 to be completely uncovered.

In order to overcome this tendency, I provide a transversely extending baffle 24 positioned below the surface of the cathode 18 and extending substantially parallel thereto. This baffle may be supported by means of brackets 26 and is preferably spaced an appreciable distance from the bottom of the envelope so that the depth of mercury above it is less than the depth below it. It is provided with a restricted opening 25 in a region underlying the electrode 19, that is, beneath the central region of the mercury surface. The effect of this opening may be seen in Fig. 2 which represents the condition of the device during a period of transition, that is, just as the device is being tilted to the left so that the cathode material is still in motion. As clearly appears in this figure the kinetic energy of the moving cathode material is sufficient to force mercury upwardly through the opening 25 around and into contact with the electrode 19. I have found that if the opening 25 is properly proportioned, the depth of immersion of the electrode tip may be maintained substantially constant for all reasonable conditions of transverse motion of the device. (In a particular case a circular opening about ⅜ of an inch in diameter has been found satisfactory although neither this shape nor size is essential.) After the device reaches a stable condition as shown in Fig. 3, the proper immersion of the electrode 19 is assured by virtue of the positioning of the electrode at the center of the mercury surface.

The form of the particular baffle which is employed in the present case is illustrated in Fig. 4 wherein is shown the opening 25 as well as a series of smaller openings 27. These latter openings are not essential but when used, afford a partial by-pass for the main aperture 25 and help to regulate the height to which the mercury builds up around the electrode 19 during tilting periods. Obviously a gap provided around the periphery of the baffle will serve the same purpose. The opening 28 is simply for the purpose of permitting the lead-in conductor 21 to project upwardly through the baffle. Numerous other baffle forms may obviously be employed.

As a result of the arrangement which I have described, a pool type discharge device embodying my invention may be used safely on shipboard or in other places where considerable motion is to be expected. Even where repeated and severe agitation involving both tilting and transverse motion is to be experienced, the use of a baffle of the kind specified assures that the ignition electrode will be maintained at all times in operative contact with the cathode material. A similar effect may clearly be obtained with other kinds of discharge-controlling means than the particular electrode shown.

While I have described my invention by reference to a particular embodiment thereof, it will be apparent that many modifications may be made by those skilled in the art without departing from the invention. I therefore aim in the appended claims to cover all such equivalent variations as fall within the true scope of the foregoing disclosure.

What I claim as new and desire to secure by Letters Patent of the United States is—

1. A discharge tube including an anode, a liquid cathode, a discharge-influencing device positioned adjacent to the cathode at a central region thereof, the said device being dependent for effective operation on the maintenance of a fixed level of cathode material in the vicinity of the device, and means for maintaining such a fixed level in spite of the occurrence of movements of the tube tending to disturb the normal level of the cathode as a whole, said means comprising a baffle beneath the surface of the cathode and extending substantially parallel thereto, the baffle being provided with a restricted opening underlying the said discharge-influencing device, whereby transverse or tilting motion of the tube forces cathode material upwardly through the opening to maintain a substantially constant level of such material above the opening.

2. An electrical discharge device comprising an elongated cylindrical envelope, an anode supported at the upper end of the envelope, a cathode comprising a pool of mercury at the lower end of the envelope, an ignition electrode normally in contact with the pool at the central region thereof, a disk-like baffle extending transversely of the envelope below the surface of the pool, said baffle being spaced a substantial distance from the bottom of the envelope and being provided with a central opening therein, whereby transverse or tilting motion of the device tends to force mercury upwardly through the opening so as to maintain the mercury in contact with the ignition electrode.

3. An electrical discharge device comprising an elongated cylindrical envelope which in normal use has its central axis in a vertical position, an anode at the upper end of the envelope, a mercury pool cathode at the lower end of the envelope, the mercury being of sufficient depth so that in a condition of stability the distance from the central region of the mercury surface to the bottom of the envelope is substantially constant even when the axis of the envelope is tilted as much as thirty degrees, an ignition electrode normally in contact with the said central region of the mercury surface, and a transversely extending baffle below the mercury surface, said baffle being appreciably spaced from the bottom of the envelope and having a restricted opening underlying the central region of the mercury surface, whereby the upward flow of mercury through the opening tends to maintain the depth of mercury in such region substantially constant even during tilting motion of the device.

4. An arc discharge device comprising a casing having an anode and a mercury pool as cathode therein, an auxiliary starting device immersed in said mercury pool during the normal operation of said device, said mercury pool having a surface freely exposed to the arc from the anode, and damping means for waves on said freely exposed mercury surface located entirely below the surface thereof.

5. An arc discharge device comprising a casing having an anode and a mercury pool as cathode therein, an auxiliary starting device immersed in said mercury pool during the normal operation of said device, said mercury pool having a surface freely exposed to the arc from the anode, and apertured damping means for waves on said freely exposed mercury surface located entirely below the surface thereof.

6. An arc discharge device comprising a casing having an anode and a mercury pool as cathode therein, said mercury pool having a surface freely exposed to the arc from the anode, an annular damping means for waves in said mercury pool located entirely below the said surface of the pool, and an auxiliary starting electrode immersed in the said pool in a region which overlies the central opening of said annular damping means.

LAWRENCE D. MILES.